June 7, 1938. P. M. BOURDON 2,120,063
TIRE
Filed May 25, 1937
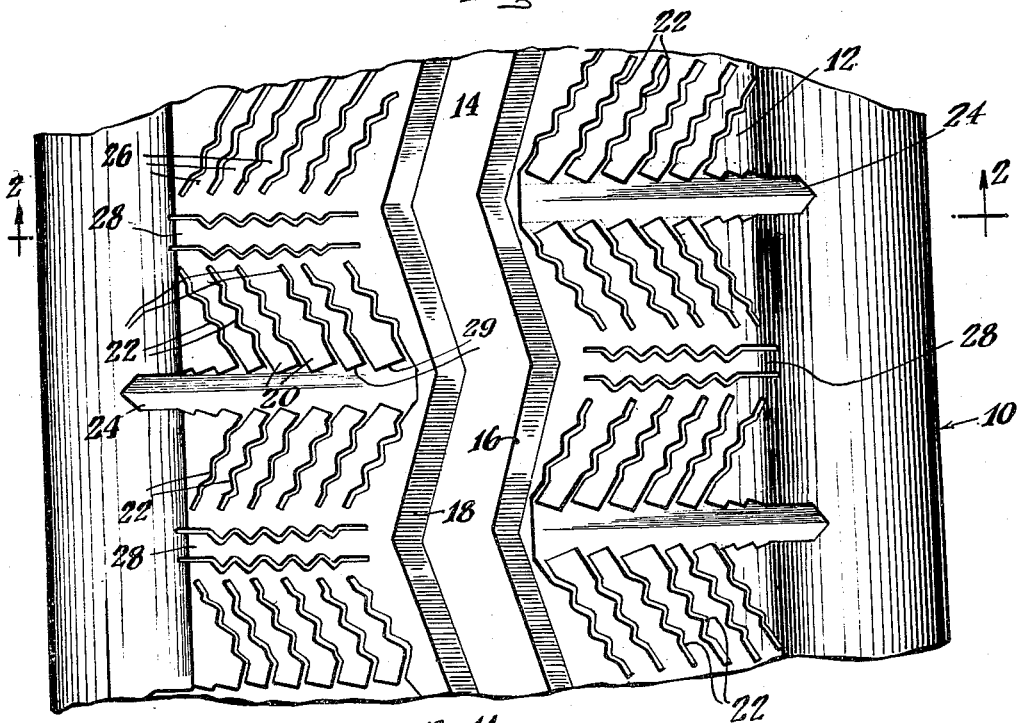
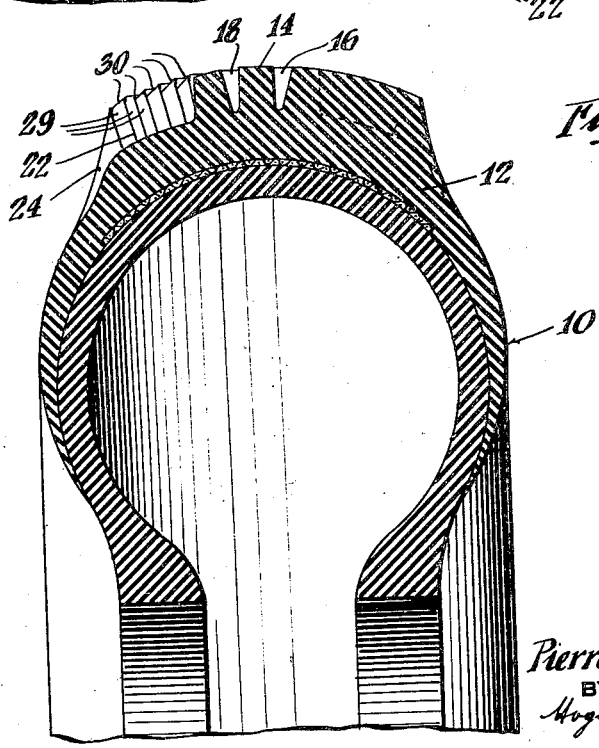
INVENTOR
Pierre Marcel Bourdon
BY
Huguet, Henry & Campbell
his ATTORNEYS Patented June 7, 1938

2,120,063

UNITED STATES PATENT OFFICE 2,120,063

TIRE

Pierre Marcel Bourdon, Paris, France, assignor to Michelin et Cie, Clermont-Ferrand, France, a corporation of France Application May 25, 1937, Serial No. 144,597

16 Claims. (Cl. 152—209)

The present invention relates to vehicle tires and more particularly to an improved tire construction by virtue of which non-skid and wearing qualities of the tire are greatly improved over those of tires now available and the susceptibility of the tire to skid through the presence of lubricants, such as oil, mud, or water on the highway is materially lessened.

This invention constitutes an improvement over the tires disclosed in my co-pending applications, Serial No. 33,434, filed July 27, 1935, and Serial No. 85,152, filed June 13, 1936.

Skidding of automobile tires is caused mainly by the presence of oil, water, mud, etc., on the highways, these substances acting as lubricants and preventing adequate frictional engagement between the tire and the highway surface. Under normal dry conditions, the frictional characteristics of rubber and the highway surfaces are sufficient to prevent skidding of tires, either of the high pressure or the balloon type, regardless of the anti-skid pattern on the tire tread. Even under wet conditions high pressure tires, because of their comparatively small road contact area and resultant greater pressure per square inch on or force normal to the road surface will tend to squeeze the lubricating medium from between the tire tread and the road surface, largely preventing skidding. Balloon or low pressure tires, however, have materially greater road contacting area and exert insufficient pressure per unit area of contact to eliminate the lubricating medium and are therefore more likely to skid.

The fundamental conception upon which the present invention is based is that by subdividing the tire tread into a plurality of comparatively small areas made up of fins or ribs of rubber that terminate in relatively large evacuating channels, a scraping or squeezing action will take place, so that wiping of the lubricants from between the tire and the roadway into the evacuating channels will be rapidly effected, thereby allowing the tread to contact the then comparatively dry road surface and exert its dry frictional characteristics to avoid skidding.

Because of the comparatively short period of time of contact between any one area of the tread of a tire with the roadway the lubricating medium must be not only squeezed out or scraped off from between the tire and the road, but also must be eliminated very quickly from the tire surface to prevent skidding. If the tire tread is made up of a number of relatively large blocks, the lubricating medium is not quickly removed, since it must travel a greater distance to an evacuating channel. The distance through which the lubricating medium must travel to be eliminated can be materially reduced by the use of comparatively small blocks having interposed evacuating channels into which the lubricating medium can flow.

Theoretically, the best possible construction, based upon this fundamental discovery, should be that the sub-division of the tire tread should be carried to the highest possible degree, to produce a very great number of comparatively small highly flexible blocks or fins on the tread surface of the tire. However, there are two limiting features which determine the extent to which subdivision of the tire tread may be carried. The first of these is that sub-division beyond a certain point will cause the tire to have a peculiar riding effect, which may be likened to riding on the bristles of a brush, rendering riding uncomfortable and causing the rear wheels to vibrate and become uncontrollable at high speeds. Secondly, if the blocks or fins are reduced to extremely small size, they will tend to wear rapidly, and also to separate or be torn loose from the remainder of the tire tread.

These practical difficulties encountered when attempting to subdivide the tire into very narrow highly flexible ribs or fins and at the same time maintain satisfactory wearing properties of the tire, may be overcome in accordance with my invention by making the ribs or fins of sufficient width or thickness to resist wear but effectively decreasing the length of the ribs by arranging them in groups and at the same time obtaining high lubricant evacuating efficiency by having the ribs terminate in relatively large evacuating channels.

Tires sub-divided into small blocks or fins also tend to wear in such a manner that the leading edge of the blocks becomes rounded, thereby allowing water to enter between the surface of the blocks and the road surface and permitting skids to take place.

The present invention contemplates the use of a plurality of fins or blocks, some of which under all circumstances are arranged in such a manner as to be substantially normal to the direction of skidding of the tire, thereby presenting elongated narrow wiping edges at substantially right angles to the direction of skidding and including interposed channels through which the skid promoting lubricant can be evacuated.

The invention further includes the arrangement of the blocks or fins in such a manner that they wear to uneven heights, whereby their wiping or scraping action is improved rather than decreased.

More particularly, the fins of the tire tread of the present invention are arranged in a zig-zag formation with their upper surfaces lying in parallel planes rather than in a single plane of the tire tread, thus presenting sharp edges having effective wiping action in the direction that a tire would normally tend to skid.

For a better understanding of the present invention, reference may be had to the accompanying drawing, in which:

Figure 1 is a plan view of a section of a tire embodying one form of the present invention;

Figure 2 is a sectional view of a tire taken along line 2—2 of Figure 1.

Illustrative of one form of the invention, Figures 1 and 2 disclose a tire casing, generally indicated as 10, having a tread portion 12 fixed to the main casing body in the usual manner and consisting of a central running band 14 generally of zig-zag formation, defined by two or more grooves 16 and 18 extending circumferentially of the tire. On opposite sides of the central running band are a plurality of repeated blocks of similar construction consisting, generally, of a plurality of fin members 20 of like configuration and consisting of generally corrugated blocks molded in the surface of the tread. The fins 20 are preferably narrower than they are high and flexible enough to allow free bending but insufficiently narrow to reduce their mechanical strength to a point which allows them to be torn apart. The fin members 20 are separated by sinuous channels 22 communicating at one end with a radially disposed wide evacuating channel 24 extending from adjacent the running band 14 to the side walls of the tire for eliminating the moisture, water or mud scraped off of the roadway by the flexible fins or blocks 20. Opening into the opposite side of the channel 24 are similar angularly arranged fins 26 of generally corrugated shape and, like fins 20, being of less width than height to produce a flexible construction. In effect, the fins 20 and 26 form a pattern of repeated chevrons each leg of which is arranged diagonally to the tire tread with at least one set of fins extending substantially perpendicularly to the direction in which tires tend to skid.

The above pattern formed by the fins 20, 26 and evacuating channel 24 is repeated on opposite sides of the tire and may be, as illustrated in Figure 1, arranged in staggered relationship to each other. If desired, thicker corrugated blocks 28 extending radially of the tire may be disposed between successive units separating the blocks made up of the fins 20, 26 and evacuating channel 24, but not communicating with the channels 22 between the fins 20 and 26. The corrugated blocks 28 give added flexibility to the tread structure and have an effective anti-skid action under driving and braking torques in planes parallel to the median plane of the tire because the leading edge of the blocks will wipe moisture from the road.

In order to avoid wear of the leading edges of the fins 20 and 26 they are preferably constructed with the edges 29 in channel 24 normal to their axes. The edges 29 will not wear equally and will not be rounded throughout their extent thus avoiding the planing action normally produced by a rounded or beveled leading edge.

Also, as best shown in Figure 2, the outer surfaces of the fins 20 and 26 do not lie in the same arcuate plane. These outer surfaces 30 are preferably arranged in parallel relationship and in echelon so that the upper edges of the same are sharp and have a desirable enhanced wiping operation. As the tire wears these edges will wear down, flattening gradually but nevertheless continuing to present sharp wiping edges for scraping moisture or mud off the road surface.

The fins 20 and 26 making up each of the repeated anti-skid patterns are preferably molded in the tire surface in order to avoid the formation of cracks and points of weakness which would promote tearing of the individual fins. In order to mold the blocks in the corrugated form disclosed, it is desirable to arrange the channels 22 at an angle to the median plane of the tire in order that the tire molds may be moved substantially axially away from the tire. Thus each channel 22 and the fins 20 and 26 are inclined with respect to the center line of the tread and at an angle to the plane of the road. The angular disposition of the channels and fins results in an increased resistance to the passage of rocks and gravel into the channels 22. The normal tendency of rotation of the tire is to force such foreign material into the channels perpendicularly to the surface of the road. Since the channels are inclined to the perpendicular, the force acting on the gravel is exerted at an angle to the walls of the channels which reduces the component, parallel to the channels, tending to force gravel into the channel. The tendency of the fins to remain in their normal undistorted position resists the entrance of gravel and exerts a squeezing action, tending to eject the foreign material.

It will be seen from the foregoing that I have provided an anti-skid pattern on a tire tread which will have an effective wiping action for removing lubricating media from between the tire tread and the road surface and that I have also provided means for rapidly eliminating the moisture removed from the roadway from the channels in the tire. Additionally I have arranged the wiping fins, forming the tire tread pattern, in such a way that they present their wiping edges in the most effective direction to avoid skidding and in such a manner that wear of the same does not reduce the wiping effect of the sub-divisions of the tires.

It will be understood that many variations may be made in the construction above described without departing from the invention. Therefore, the typical embodiment described should be considered as illustrative only and not as limiting the scope of the following claims.

I claim:

1. A vehicle tire comprising a tread portion, radially opening channels extending transversely of said tread and a plurality of spaced apart elongated narrow fins inclined at an acute angle to each of said channels with the spaces between said fins opening into said channels.

2. A vehicle tire comprising a tread portion, a plurality of similar anti-skidding elements on said tread, each element comprising a plurality of substantially parallel fins extending diagonally of said tread, and a second plurality of substantially parallel fins extending diagonally of said tread at an angle to the first mentioned fins.

3. A vehicle tire comprising a tread portion, a plurality of similar anti-skid elements on said tread, each element comprising two sets of angularly related spaced fins extending diagonally of said tread and defining communicating channels between each of said fins and a larger channel between each set of fins extending transversely of said tread.

4. In a vehicle tire having a tread with anti-skid elements thereon, comprising a plurality of spaced elongated narrow parallel fins extending diagonally of said tread, another plurality of similar fins extending at an angle to the first fins and diagonally of said tread, the adjacent ends of said fins being spaced apart to define a wide channel extending transversely of said tread.

5. The vehicle tire defined in claim 4 in which the fins are corrugated.

6. The vehicle tire defined in claim 4 in which the fins are provided with corrugations extending radially of said tire.

7. A vehicle tire comprising a tread, a plurality of repeated anti-skid elements arranged circumferentially of said tread, said repeated anti-skid elements comprising a plurality of pairs of angularly related fins of less width than height having their adjacent ends spaced apart to provide a channel extending transversely of said tread, and a wider fin between pairs of said anti-skid elements extending transversely of said tread.

8. The vehicle tire defined in claim 7, in which the lateral sides of the angularly related fins are corrugated.

9. The vehicle tire defined in claim 7 in which the wider fin is corrugated.

10. The vehicle tire defined in claim 7 in which the lateral side of the angularly related fins and the wider fin are corrugated.

11. A vehicle tire comprising a tread having a plurality of elongated anti-skid fins of less width than height disposed diagonally of said tread, and evacuating channels in said tread intersecting said fins.

12. A vehicle tire comprising a tread having a plurality of elongated fins of less width than height disposed diagonally of and on opposite sides of the center line of said tread, and evacuating channels in said tread intersecting said fins.

13. A vehicle tire comprising a tread having a plurality of pairs of elongated fins disposed at angles to each other and diagonally of and on opposite sides of the center line of said tread, and evacuating channels in said tread intersecting said fins.

14. The vehicle tire defined in claim 11 in which the outer edges of the fins are in different substantially parallel planes.

15. The vehicle tire defined in claim 12 in which the outer edges of the fins are in different substantially parallel planes.

16. The vehicle tire defined in claim 13 in which the outer edges of the fins are in different substantially parallel planes.

PIERRE MARCEL BOURDON.